March 28, 1933.  H. R. KENNEDY  1,903,051
WHEEL ALIGNING GAUGE
Filed Nov. 5, 1930
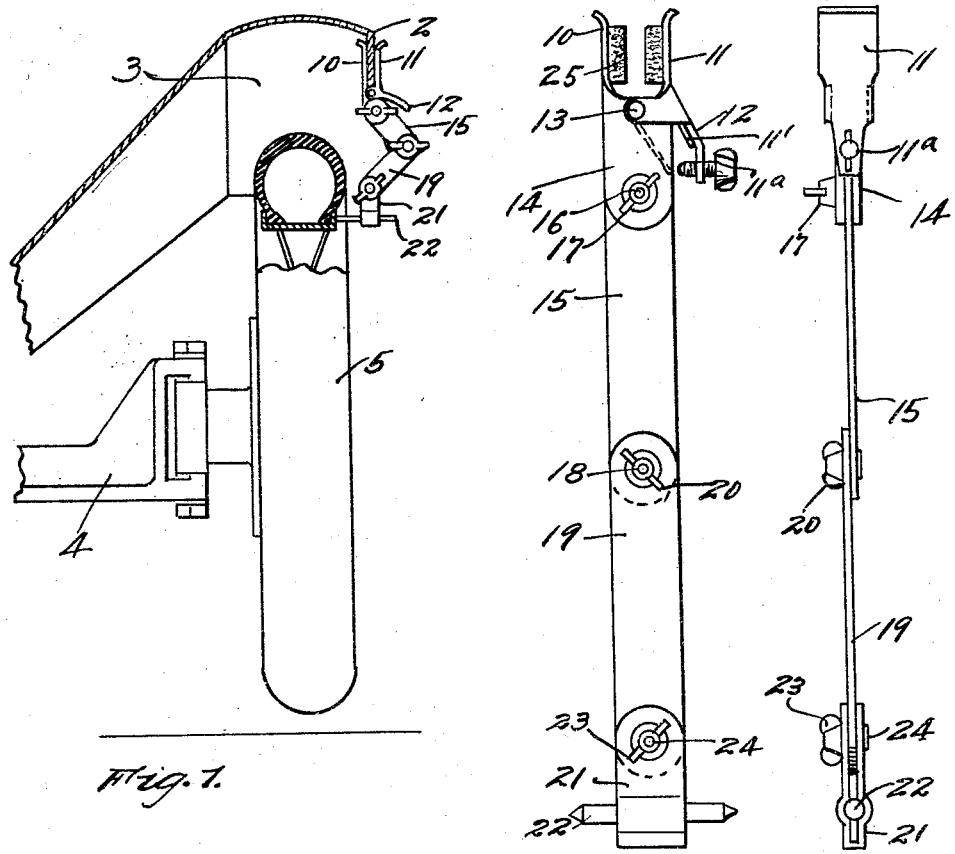
INVENTOR,
Homer R. Kennedy;
BY
F. E. Maynard
ATTORNEYS.

Patented Mar. 28, 1933

1,903,051

UNITED STATES PATENT OFFICE

HOMER R. KENNEDY, OF LOS ANGELES, CALIFORNIA

WHEEL ALIGNING GAUGE

Application filed November 5, 1930. Serial No. 493,581.

This invention relates to a tool to facilitate testing and indicating whether or not a wheel or other rotating body is running with the desired trueness to gauge.

It is an object to provide a simple, practical, substantial and readily utilized tool which is capable of being instantly clamped onto a portion of a mud guard or fender of a road vehicle and in such a position thereon as to be easily juxtaposed with respect to the object in place, so that by merely rotating the object, the present improved indicator will mark it at a spot or spots if it is out of true.

A further object is to provide a light and compactly collapsible tool which can be made and sold at a cost enabling purchase by individual expert mechanics desiring to add a device of this character to their kit or outfit; it being a purpose to provide a tool which, while having a great range of adjustment and of durable construction, will at the same time be sufficiently light in weight to be easily packed and transported in the mechanician's kit.

This invention consists in certain advancements in this art as set forth in the ensuing disclosure and having, with the above, additional objects and advantages, and whose construction, combination and details of means, and the manner of operation will be made manifest in the description of the herewith illustrative embodiment; it being understood that modifications, variations and adaptations may be resorted to within the scope, principle and spirit of the invention as it is more directly claimed hereinafter.

Figure 1 is an elevation of the tool as applied to a vehicle fender for gauging and indicating trueness of one of its wheels.

Figure 2 is a side elevation of the detached tool.

Figure 3 is an edge view of the tool.

In its illustrated embodiment, the invention comprises a clamp device adapted to grip onto the usual down-turned flange 2 of a mud fender 3 of a vehicle on whose axle 4 is mounted a wheel 5, or onto some other convenient support as to a rotating object to be gauged.

The clamp device includes a pair of opposed jaws 10 and 11, the latter having a finger arm 12 whereby it may be pressed down about its pivot 13 to open the jaw 11 as to the jaw 10 for the introduction of the fender flange 2; the jaw 11 being closed by suitable means as a spring 11' or a set-screw 11ª, for positive grip.

The base jaw 10 has a hub portion 14, embracing an intermediate connecting link 15 which is pivoted to the jaw 14 by a pivot bolt 16 provided with a wing or clamp nut 17, whereby to clamp the hub 14 tightly on the end of the link 15 when desired.

The link 15 is pivotally connected at 18 to a link section 19; these parts being clamped at will by suitable means, as a wing nut 20 or other means of the pivot connection.

The lower end of the link section 19, which with the link 15 constitutes an adjustable arm, has on its lower end a pivoted marker holder 21, designed to clamp an inserted scriber 22 of any suitable character; the holder being clamped in adjustable position by suitable means, as a wing-nut 23 on the pivot 24 which connects the parts.

In the use of the instrument for vehicle wheels, the clamp 10—11 is applied to the flange 2 and the articulated arm 15—19 and marker holder 21 are manipulated so as to bring the scriber 22 against a contiguous portion of the wheel 5 and more especially against its rim 6 or tire thereon. The wheel 5, being jacked up, can rotate on its spindle or with its axle, and if the rim, wheel or tire is out of alignment on one side or another, this will be indicated by its contact with and disengagement from the scriber 22 in accordance with the deformity of the rim or tire, and this can be trued up in any desired manner until it runs to gauge as indicated by its contact with the scriber 22.

In order to avoid marring the finish of the fender flange 2, cushion pads 25 are provided on the inside face of the clamp jaws.

It will be seen that while the device is simple and of low cost, it is of practical use, is light and substantial, and can be adjusted in any position for application to various forms of vehicle fenders and also can be extended or collapsed as most desirable to be arranged in a kit or box or on a shop tool rack.

It is understood that the device may be made of any suitable material and finish and in various sizes, and has general use in testing trueness of rotating objects.

What is claimed is:

1. A vehicle wheel alignment gauge comprising, in combination, a clamp device with jaws adapted to be closed on the flange or rim of the fender of such vehicle so as to permit adaptation of the gauge conveniently to the upper outside of the wheel to be tested, and an articulated arm pivotally attached to said clamp and provided with a scribing device to engage the wheel.

2. A vehicle wheel alignment gauge comprising, in combination, a clamp device with jaws adapted to be closed on the flange or rim of the fender of such vehicle so as to permit adaptation of the gauge conveniently to the upper outside of the wheel to be tested, and an articulated arm pivotally attached to said clamp and provided with a scribing device to engage the wheel; said scribing device including a holder and a stick of stripe making material adjustable in the holder.

3. A gauge to facilitate the test of alignment of a wheel in place on a road vehicle and comprising a clamp attachable to the rim of a fender of the vehicle, an articulated arm attached to said clamp, and a marker attached to said arm so as to be positionable adjacent the upper outer part of the wheel rim to be tested.

4. A vehicle wheel alignment gauge including a clamp to grip a fender of the vehicle, an articulated arm pivotally attached to the clamp, and a marker pivoted on said arm to engage a wheel in place on the vehicle.

HOMER R. KENNEDY.